United States Patent
Li et al.

(10) Patent No.: US 11,394,197 B2
(45) Date of Patent: Jul. 19, 2022

(54) RING-CONNECTED BRIDGE-TYPE MULTI-PORT HYBRID DC CIRCUIT BREAKER

(71) Applicant: BEIJING JIAOTONG UNIVERSITY, Beijing (CN)

(72) Inventors: Meng Li, Beijing (CN); Yiping Luo, Beijing (CN); Jinghan He, Beijing (CN); Yin Xu, Beijing (CN); Qiufang Zhang, Beijing (CN); Guomin Luo, Beijing (CN); Dahai Zhang, Beijing (CN); Xiaojun Wang, Beijing (CN); Fang Zhang, Beijing (CN); Xiangyu Wu, Beijing (CN); Pinghao Ni, Beijing (CN)

(73) Assignee: BEIJING JIAOTONG UNIVERSITY, Beijing (CN)

(*) Notice: Subject to any disclaimer, the term of this patent is extended or adjusted under 35 U.S.C. 154(b) by 0 days.

(21) Appl. No.: 16/975,007

(22) PCT Filed: Apr. 24, 2019

(86) PCT No.: PCT/CN2019/084093
§ 371 (c)(1),
(2) Date: Aug. 21, 2020

(87) PCT Pub. No.: WO2020/191847
PCT Pub. Date: Oct. 1, 2020

(65) Prior Publication Data
US 2022/0006286 A1   Jan. 6, 2022

(30) Foreign Application Priority Data
Mar. 28, 2019 (CN) .......................... 201910243587.1

(51) Int. Cl.
*H02H 7/26* (2006.01)
*H02H 1/00* (2006.01)

(52) U.S. Cl.
CPC ............ *H02H 7/26* (2013.01); *H02H 1/0007* (2013.01)

(58) Field of Classification Search
CPC ........ H01H 33/596; H01H 33/59; H02H 1/00; H02H 1/0007; H02H 7/26; H02H 7/267;
(Continued)

(56) References Cited

U.S. PATENT DOCUMENTS

| 8,717,716 B2* | 5/2014 | Hafner | H01H 9/542 361/8 |
| 10,122,163 B2* | 11/2018 | Majumder | H02J 1/10 |
| 10,756,535 B2* | 8/2020 | Tang | H01H 33/596 |

FOREIGN PATENT DOCUMENTS

| CN | 106253728 A | * | 12/2016 | | H02M 7/49 |
| CN | 109510178 A | * | 3/2019 | | H02H 7/22 |

OTHER PUBLICATIONS

J. He, Y. Luo, M. Li, G. Luo, L. Han and T. Feng, "An Integrated Multi-port Hybrid DC Circuit Breaker," 2019 IEEE 8th International Conference on Advanced Power System Automation and Protection (APAP), 2019, pp. 307-311. Retrieved from the Internet: <https://ieeexplore.ieee.org/document/9224778> (Year: 2019).*

* cited by examiner

*Primary Examiner* — Jared Fureman
*Assistant Examiner* — Nicolas Bellido
(74) *Attorney, Agent, or Firm* — CBM Patent Consulting, LLC

(57) ABSTRACT

It discloses a ring-connected bridge-type multi-port hybrid DC circuit breaker. When the number of ports is n, n is an integer greater than or equal to 2, the ring-connected bridge-type multi-port hybrid DC circuit breaker includes: an upper
(Continued)

DC bus bar, a lower DC bus bar, n thyristor arms, n diode arms, a main breaker branch, and n bypass branches; each thyristor arm connects in series with a diode arm, forming a series circuit; a bypass branch is connected between every two adjacent series circuits, a port is provided at the connection point of the thyristor arm and the diode arm in each series circuit, and the port is used to connect the protected components or the DC lines.

10 Claims, 9 Drawing Sheets

(58) Field of Classification Search
CPC ............ H02H 7/268; H02H 7/28; H02H 7/30; H02H 9/00
See application file for complete search history.

RING-CONNECTED BRIDGE-TYPE MULTI-PORT HYBRID DC CIRCUIT BREAKER

TECHNICAL FIELD

This invention relates to the technical field of DC circuit breakers, and particularly to a ring-connected bridge-type multi-port hybrid DC circuit breaker.

BACKGROUND

Voltage source converters are based on the full-controlled power electronics and adopt the pulse width modulation technology. It has the advantages of active and reactive power decoupling control, large transmission capacity, no filtering and reactive compensation equipment, and can supply power to the weak AC systems. DC grids which employ the voltage source converters provide an effective solution for the centralized and large-scale development of renewable energy, large capacity long-distance transmission, and improving the flexibility and reliability of power grid operation. When the DC fault happens in a DC grid, the fault current can surge to tens of times of the rated current in a few milliseconds, which may cause severe damages to the system if not quickly isolated. Using DC circuit breakers to isolate DC fault can ensure the continuous operation of the system in the process of fault isolation. Therefore, the DC circuit breaker has become one of the key devices in developing a flexible DC grid.

At present, DC circuit breakers used in flexible DC power grids can be roughly divided into three categories: mechanical DC disconnector-based mechanical DC circuit breakers, pure power electronic switches based solid-state DC circuit breakers and the mechanical disconnector and power electronic switches-based hybrid DC circuit breakers. Among them, the hybrid DC circuit breaker is preferable because of its low on-state loss comparable to the mechanical DC circuit breaker and its fast-effective fault current interruption capability comparable to the solid-state DC circuit breaker.

Conventional hybrid DC circuit breakers usually contain two ports and are also called two-port hybrid DC circuit breaker. FIG. 1 illustrates the topology of a two-port hybrid DC circuit breaker, and FIG. 2 shows the installation scheme of the two-port hybrid DC circuit breaker to protect a DC node that has connected n DC lines. As can be seen, the two-port hybrid DC circuit breaker consists of a bypass branch and a main breaker branch. Herein, the bypass branch is formed by a mechanical ultra-fast disconnector (UFD) in series with a load commutation switch (LCS) while the shared main breaker branch is comprised of a string of reverse series power electronic switches (T) paralleled with individual surge arrester (SA). Since the shared main breaker branch requires a considerable number of series power electronic switches to withstand high overvoltage during the current interruption, the single two-port hybrid DC circuit breaker will have a high-cost problem. Furthermore, in the DC grid, several two-port hybrid DC circuit breakers may be required to protect only one DC node, making the high-cost problem even worse.

To solve the high-cost problem, scholars have proposed the concept of the ring-connected bridge-type multi-port hybrid DC circuit breaker in recent years. The basic idea is integrating multiple two-port hybrid DC circuit breakers connected to the same DC bus to a ring-connected bridge-type multi-port hybrid DC circuit breaker so as to use a shared main breaker branch to interrupt the fault current on multiple lines. Since the cost of a two-port hybrid DC circuit breaker mainly lies in its main breaker branch, the use of ring-connected bridge-type multi-port hybrid DC circuit breaker will significantly reduce the number of the power electronic switches and reduce the overall cost of employing hybrid DC circuit breakers in DC grids. However, the interruption performance of the existing ring-connected bridge-type multi-port hybrid DC circuit breaker still needs further improvement. And the major problem in the field of the ring-connected bridge-type multi-port hybrid DC circuit breaker is to achieve lower costs and higher reliability without losing any current interruption capability.

FIG. 3 shows the simplified structure of the typical existing ring-connected bridge-type multi-port hybrid DC circuit breakers, which consists of two DC bus bars and three types of branches: bypass branches, a shared main breaker branch, and selectors. In normal operation, the bypass branch is conducted while the shared main breaker branch and the selectors are disconnected. When the fault occurs at port-1, selector-1 immediately conducts. Therefore, bypass branch-1, the shared main breaker branch, together with selector-1 can form a typical two-port hybrid DC circuit breaker for port-1 fault current interruption.

According to the fault current interruption needs of the DC girds, the ring-connected bridge-type multi-port hybrid DC circuit breaker should meet the following requirements.

1) The ring-connected bridge-type multi-port hybrid DC circuit breaker should be able to interrupt bidirectional currents, as the power flow in the DC grid is bidirectional and the fault current may come from any direction (such as line faults and bus faults). Otherwise, some types of fault current or the load current cannot be interrupted.

2) A transient interruption voltage (TIV) with a large amplitude will appear across the breaker when turning off the main breaker branch. Because the fault current is from either direction, the transient interruption voltage may be positive or negative. Therefore, the branches which are equivalent to be paralleled to the shared main breaker during isolating faults should be able to withstand forward and reverse transient interruption voltage.

3) The ring-connected bridge-type multi-port hybrid DC circuit breaker is supposed to keep the implementation cost as low as possible. Also, its structure should be simple, reliable, and easy for future expansion.

The design schemes of the existing ring-connected bridge-type multi-port hybrid DC circuit breakers include the following four types.

1) Type 1: a unidirectional bypass branch is used as the selector, as shown in FIG. 4 (FIG. 4a is the original topology, FIG. 4b is the deformed topology). Due to the unidirectional shared main breaker and selectors, the load current feeding into the port and the DC bus fault current cannot be commutated to the shared main breaker and interrupted.

2) Type 2: a diode string is used as the selector, as shown in FIG. 5 (FIG. 5a is the original topology, FIG. 5b is the deformed topology). Also, since the selectors are unidirectional, the load current feeding into the port and the DC bus fault current cannot be commutated to the shared main breaker and interrupted.

3) Type 3: a thyristor string is used as the selector, as shown in FIG. 6 (FIG. 6a is the original topology, FIG. 6b is the deformed topology). Also, since the selectors are unidirectional, the load current feeding into the port and the DC bus fault current cannot be commutated to the shared main breaker and interrupted.

4) Type 4: a circuit consisting of a bidirectional main breaker cell in series with a thyristor string with anti-parallel diodes is taken as the selector. However, since only one bidirectional main breaker cell is adopted in each selector, the selectors are quite easy to be damaged by the reverse transient interruption voltage.

It can be seen that the existing ring-connected bridge-type multi-port hybrid DC circuit breaker fails to fully consider the above principles. As a result, although the number of the power electronic switch is reduced, some important fault handling capabilities are lost.

SUMMARY

The invention provides a novel ring-connected bridge-type multi-port hybrid DC circuit breaker to improve the economical performance of the existing ring-connected bridge-type multi-port hybrid DC circuit breaker while maintaining its full fault interruption capabilities.

To achieve the above purpose, the present invention adopts the following technical scheme.

The ring-connected bridge-type multi-port hybrid DC circuit breaker, when the number of the port is n (n is an integer greater than or equal to 2), includes an upper DC bus bar, a lower DC bus bar, n thyristor arms, n diode arms, a shared main breaker branch, and n bypass branches.

Each thyristor arm connects in series with a diode arm, forming a series circuit. All of the series circuits are connected in parallel to the shared main breaker branch to form a parallel circuit. One end of the parallel circuit is connected to the upper DC bus bar while the other end is connected to the lower DC bus bar. A bypass branch is connected between every two adjacent series circuits, and a port is provided at the connection point of the thyristor arm and the diode arm in each series circuit. The port is used to connect the protected components or the DC lines.

All the bypass branches are connected into a ring, which provides a bidirectional flow path for the current in normal operating mode. All the thyristor arms, the diode arms, and the shared main breaker branch together form a bridge circuit, which is able to provide a bidirectional flow path for the fault current in the fault interruption mode and the reclosing mode.

Preferably, both ends of the bypass branch are connected to a common connection point between the thyristor arm and the diode arm in two adjacent series circuits.

Preferably, the thyristor arm is formed by multiple thyristors connected in series in the same direction, and the diode arm is formed by multiple diodes connected in series in the same direction.

Preferably, the DC circuit breaker can be installed at a DC node or a DC bus connected with multiple DC lines. When the dc node or DC bus is in the system positive pole, the cathode of the thyristor arm will be connected to the upper DC bus bar, the anode of the thyristor arm will be connected to the cathode of the diode arm, and the anode of the diode arm will be connected to the lower DC bus bar;

When the dc node or DC bus is in the system negative pole, the cathode of the diode arm will be connected to the upper DC bus bar, the anode of the diode arm will be connected to the cathode of the thyristor arm, and the anode of the thyristor arm will be connected to the lower DC bus bar.

Preferably, the shared main breaker branch includes a string of main breaker cells connected in series. Each main breaker cell is composed of multiple full-controlled power electronic switches with anti-parallel diodes connected in series in the same direction and then connected in parallel with a metal oxide surge arrester. The current of the full-controlled power electronic switches in the main breaker cell only flows from the upper DC bus bar to the lower DC bus bar.

Preferably, the bypass branch is formed by connecting a fast mechanical switch and a load commutation switch in series, and the load commutation switch is composed of two full-controlled power electronic switches with anti-parallel diodes connected in reverse series.

Preferably, the operation mode of the ring-connected bridge-type multi-port hybrid DC circuit breaker includes normal operation mode, fault interruption mode, and the reclosing mode.

When the ring-connected bridge-type multi-port hybrid DC circuit breaker works in the normal operation mode, all the thyristor arms and the shared main breaker branch are in the off-state. All the bypass branches are in the conduction state, and the working current will only flow through the bypass branches.

Preferably, when the ring-connected bridge-type multi-port hybrid DC circuit breaker works in the fault interruption mode, the ports where fault happens are defined as the faulty port while the other port is defined as the healthy port, the ring-connected bridge-type multi-port hybrid DC circuit breaker will successively go through a fault current detection stage, a fault current commutation stage and a fault energy dissipation stage;

The handling process of the ring-connected bridge-type multi-port hybrid DC circuit breaker in the fault current detection stage includes: a fault occurs at a port, the protection of the DC gird detects the fault and sends the faulty port trip signal to the ring-connected bridge-type multi-port hybrid DC circuit breaker, the ring-connected bridge-type multi-port hybrid DC circuit breaker still works in the normal operation mode, and the healthy port feeds current into the faulty port only through the bypass branch.

The handling process of the fault commutation stage includes: after the ring-connected bridge-type multi-port hybrid DC circuit breaker receives the faulty port trip signal, conducting all the thyristor arms in the series circuits, and conducting the full-controlled power electronic switches in the main breaker branch; blocking the load commutation switches on the two bypass branches connected to the faulty port, when the current of the two bypass branches connected to the faulty port drops to zero, disconnecting the fast mechanical switches on the two bypass branches connected to the faulty port;

The handling process of the fault energy dissipation stage includes: after the contacts of the fast mechanical switch on the two bypass branches connected to the fault port reach the rated opening distance, blocking all the full-controlled power electronic switches on the main breaker branch, the generated transient interruption voltage will break down the surge arresters connected in parallel with the full-controlled power electronic switches, the fault current will be redirected to the surge arresters, the surge arrester will then dissipate the fault energy, and the fault current will gradually drop to zero.

Preferably, the ring-connected bridge-type multi-port hybrid DC circuit breaker works in the reclosing mode, the handling process contains three steps:

Step 1: conduct all the thyristor arms in the series circuit, conduct the full-controlled power electronic switches on the main breaker branch;

Step 2: after step 1, when a current surge appears on the ring-connected bridge-type multi-port hybrid DC circuit breaker, it means that the fault still exists on the DC line connected to the port to be reclosed, the full-controlled power electronic switches on the shared main breaker branch will be re-blocked again; when the surge current drops to zero, opening the disconnector connected at the faulty port and physically isolate the faulty port;

Step 3: after step 1, when the current surge doesn't appear on the ring-connected bridge-type multi-port hybrid DC circuit breaker, it means that there is no fault on the DC line connected the port to be reclosed. Then, conduct the fast mechanical switches on the two bypass branches connected to the port to be reclosed, conduct the load commutation switches on the two bypass branches connected to the port to be reclosed, and block the full-controlled power electronic switches on the shared main breaker branch and the thyristor arms. Finally, the ring-connected bridge-type multi-port hybrid DC circuit breaker will recover to the normal operation mode.

Preferably, when multiple port faults occur in the ring-connected bridge-type multi-port hybrid DC circuit breaker, each faulty port will be isolated at the same time, and the shared main breaker branch will carry the sum of the fault currents of all the faulty ports.

For the problem of bus faults in the DC grid, when the ring-connected bridge-type multi-port hybrid DC circuit breaker is employed, the bus fault can be effectively avoided as the diode arm and the thyristor arm block the flow path of the bus fault current.

It is seen that compared with the two-port hybrid DC circuit breaker scheme, the present ring-connected bridge-type multi-port hybrid DC circuit breaker can greatly reduce the number of full-controlled power electronic switches and the implementation cost while ensuring the same fault interruption capability. Compared with the existing ring-connected bridge-type multi-port hybrid DC circuit breaker, the present ring-connected bridge-type multi-port hybrid DC circuit breaker uses a smaller number of full-controlled power electronic switches, has a complete current interruption capability, and can solve the problem of bidirectional current interruption and the bus fault current interruption that are difficult for the existing ring-connected bridge-type multi-port hybrid DC circuit breaker to deal with.

Additional aspects and advantages of the present invention will be partially given in the following description, and these will become apparent from the following description, or be learned through the practice of the present invention.

BRIEF DESCRIPTION OF DRAWINGS

In order to more clearly explain the technical solutions of the embodiments of the present invention, the drawings required for the description of the embodiments will be briefly introduced below. Obviously, the drawings in the following description are only some embodiments of the present invention. Those of ordinary skill in the art can obtain other drawings based on these drawings without creative efforts.

DETAILED DESCRIPTION

Figure 1:
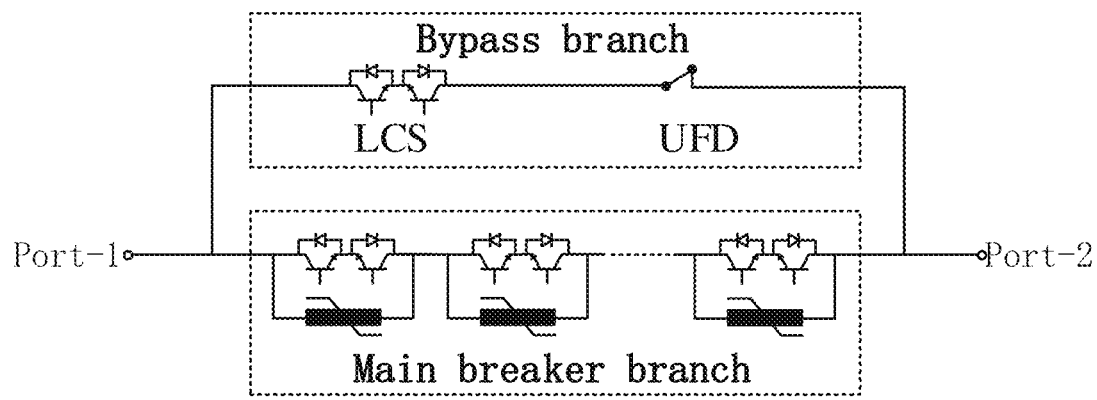
FIG. 1 is the schematic diagram of the topology of a typical two-port hybrid DC circuit breaker.
Figure 2:
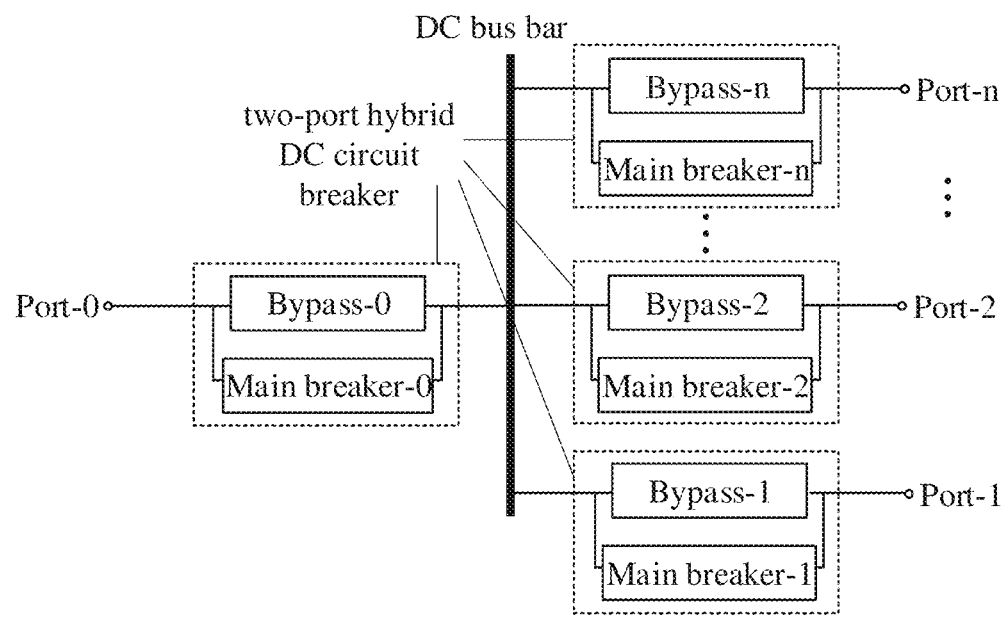
FIG. 2 is the installation schematic diagram of the existing two-port hybrid DC circuit breaker.
Figure 3:
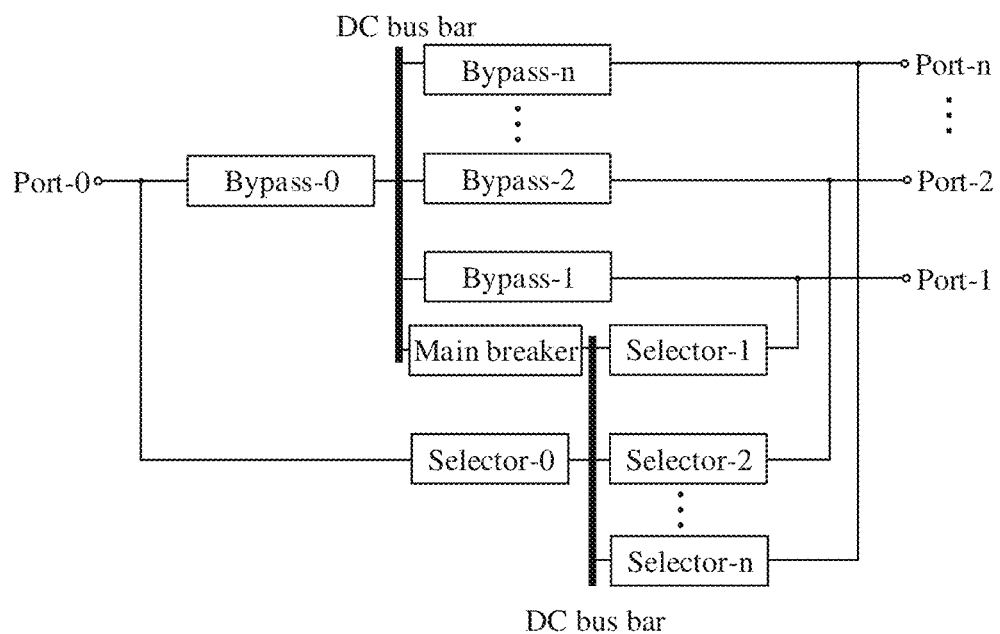
FIG. 3 is the schematic diagram of the typical topology of an existing ring-connected bridge-type multi-port hybrid DC circuit breaker.
Figure 4A:
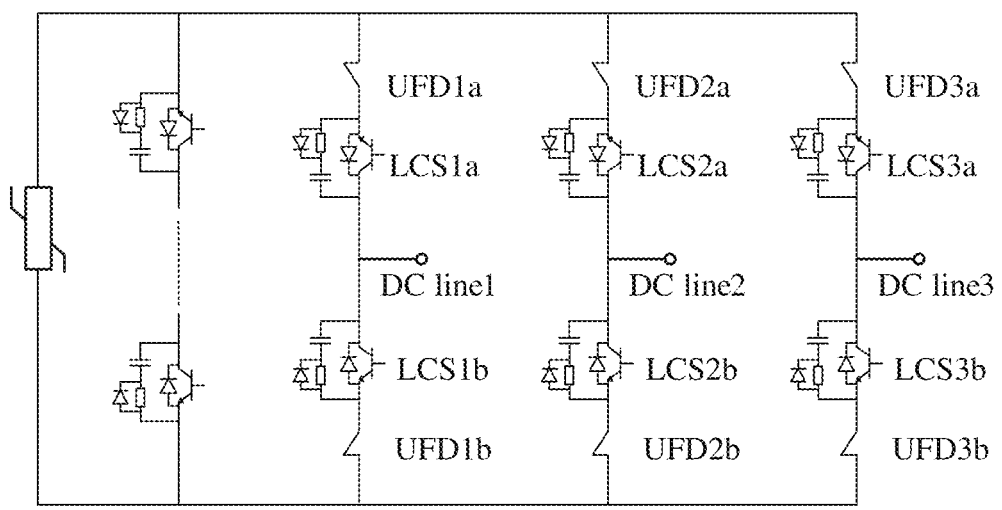
FIG. 4a is the topology schematic diagram of an existing ring-connected bridge-type multi-port hybrid DC circuit breaker with a unidirectional bypass branch as a selector (original topology)
Figure 4B:
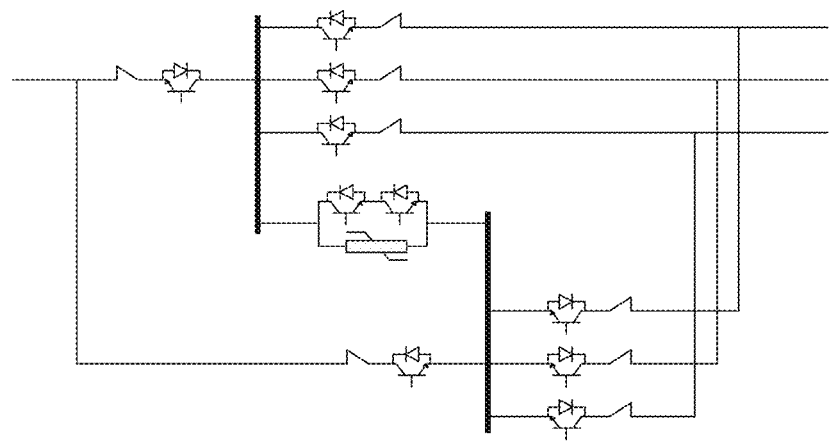
FIG. 4b is the topology schematic diagram of an existing ring-connected bridge-type multi-port hybrid DC circuit breaker with a unidirectional bypass branch as a selector (equivalent topology)
Figure 5A:
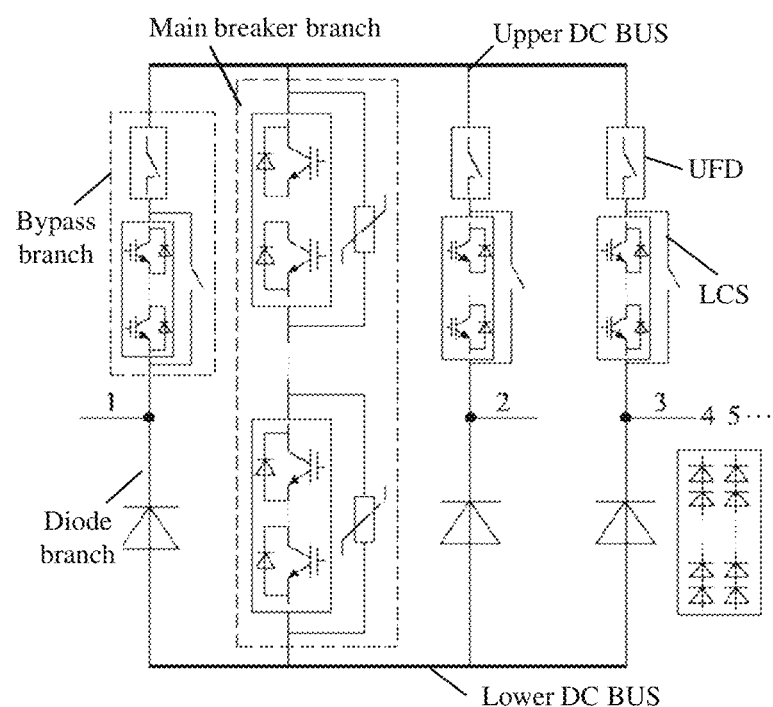
FIG. 5a is the topology schematic diagram of an existing ring-connected bridge-type multi-port hybrid DC circuit breaker with a unidirectional diode as a selector (original topology)
Figure 5B:
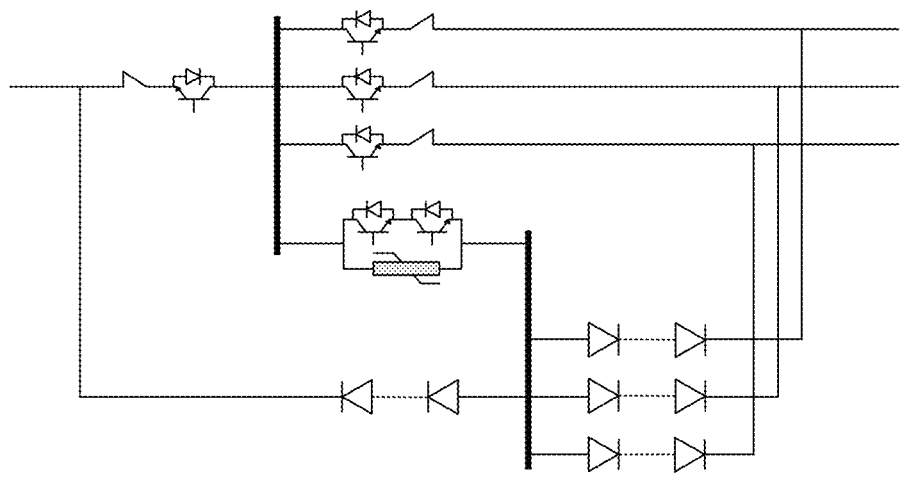
FIG. 5b is the topology schematic diagram of an existing ring-connected bridge-type multi-port hybrid DC circuit breaker with a unidirectional diode as a selector (equivalent topology)
Figure 6A:
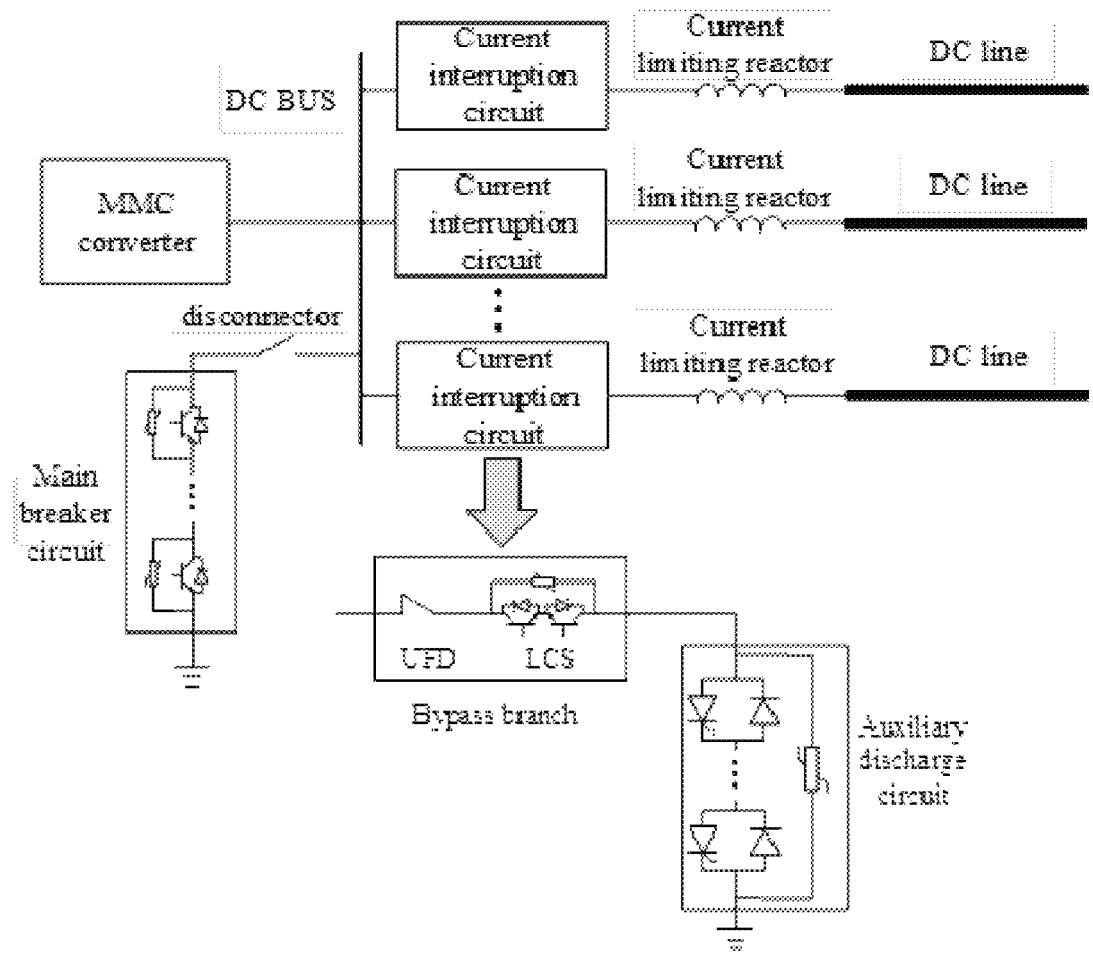
FIG. 6a is the topology schematic diagram of an existing ring-connected bridge-type multi-port hybrid DC circuit breaker with a unidirectional series thyristor as a selector (original topology)
Figure 6B:
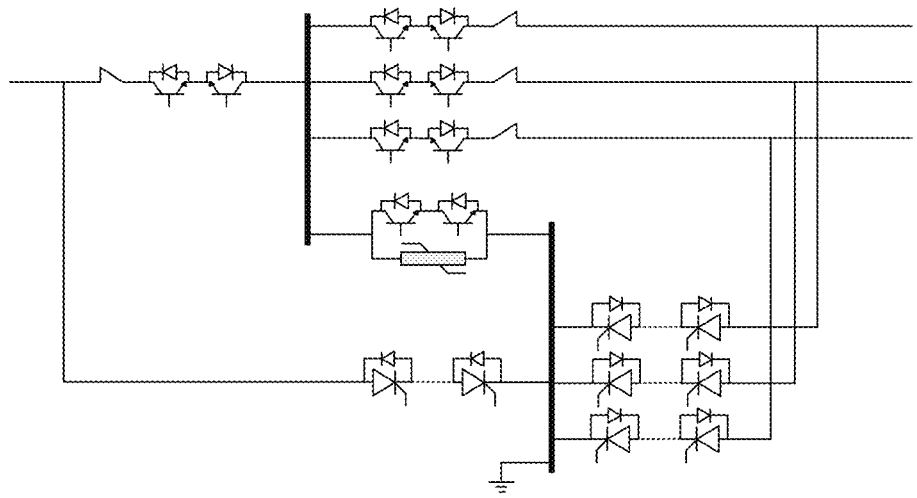
FIG. 6b is the topology schematic diagram of an existing ring-connected bridge-type multi-port hybrid DC circuit breaker with a unidirectional series thyristor as a selector (equivalent topology)

The embodiments of the present invention are described in detail below. Examples of the embodiments are shown in the drawings, in which the same or similar reference numerals indicate the same or similar elements or elements having the same or similar functions. The embodiments described below with reference to the drawings are exemplary, and are only used to explain the present invention, and cannot be construed as limiting the present invention.

Those skilled in the art can understand that unless specifically stated, the singular forms "a", "an", "said" and "the" used herein may also include the plural forms. It should be further understood that the word "including" used in the description of the present invention refers to the presence of the described features, integers, steps, operations, elements and/or components, but does not exclude the presence or addition of one or more other features, Integers, steps, operations, elements, components, and/or their groups. It should be understood that when an element is referred to as being "connected" or "coupled" to another element, it can be directly connected or coupled to the other element, or intervening elements may also be present. In addition, "connected" or "coupled" as used herein may include wirelessly connected or coupled. The expression "and/or" as used herein includes any unit and all combinations of one or more associated listed items.

Those skilled in the art can understand that unless otherwise defined, all terms (including technical and scientific terms) used herein have the same meaning as those generally understood by those of ordinary skill in the art to which the present invention belongs. It should also be understood that terms such as those defined in a general dictionary should be understood to have a meaning consistent with the meaning in the context of the prior art, and unless defined as here, will not be used with idealized or overly formal meaning Explanation.

In order to facilitate the understanding of the embodiments of the invention, multiple specific embodiments will be taken as examples for further explanation in conjunction with the drawings, and each embodiment does not constitute a limitation on the embodiments of the invention.

The invention provides a ring-connected bridge-type hybrid DC circuit breaker, which can maintain the full fault current interruption capability while reducing the number of full-controlled power electronic switches and the implementation cost required when employing hybrid DC circuit breaker for protection in the DC gird.

Figure 7:
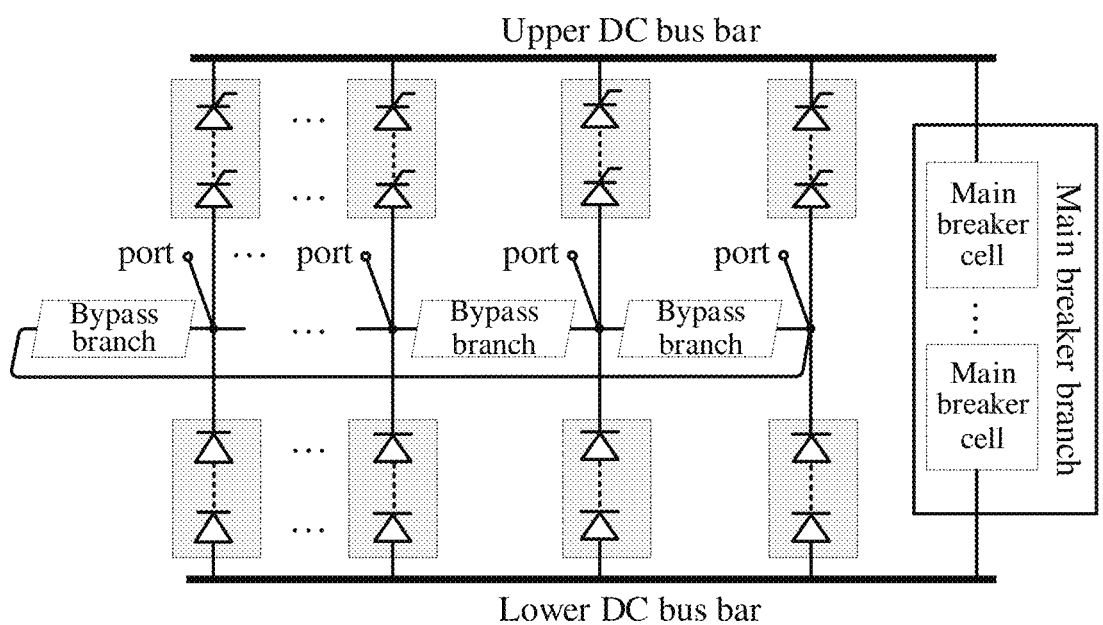
FIG. 7 is the schematic structural diagram of the ring-connected bridge-type multi-port hybrid DC circuit breaker according to an embodiment of the invention.

The schematic structural diagram of the ring-connected bridge-type multi-port hybrid DC circuit breaker according to an embodiment of the invention is shown as in FIG. 7. n-port present hybrid DC circuit breaker contains an upper DC bus bar, a lower DC bus bar, n thyristor arms, n diode arms, a main breaker branch, and n bypass branches.

The connection of these branches are as follows:

Each thyristor arm connects in series with a diode arm, forming a series circuit. All of the series circuits are connected in parallel to the shared main breaker branch to form a parallel circuit. One end of the parallel circuit is connected to the upper DC bus bar while the other end is connected to the lower DC bus bar. A bypass branch is connected between every two adjacent series circuits, and a port is provided at the connection point of the thyristor arm and the diode arm in each series circuit. The port is used to connect the protected components or the DC lines. Both ends of the bypass branch are connected to a common connection point between the thyristor arm and the diode arm in two adjacent series circuits; all the bypass branches are connected into a ring, which provides a bidirectional flow path for the current in normal operating mode. All the thyristor arms, the diode arms, and the shared main breaker branch together form a bridge circuit, which is able to provide a bidirectional flow path for the fault current in the fault interruption mode and the reclosing mode.

The circuit structure diagram of each branch is as follows:

The thyristor arm is formed by multiple thyristors connected in series in the same direction, and the diode arm is formed by multiple diodes connected in series in the same direction. When the dc node or DC bus is in the system's positive pole, the cathode of the thyristor arm will be connected to the upper DC bus bar, the anode of the thyristor arm will be connected to the cathode of the diode arm, and the anode of the diode arm will be connected to the lower DC bus bar, when the DC node or DC bus is in the system's negative pole, the cathode of the diode arm will be connected to the upper DC bus bar, the anode of the diode arm will be connected to the cathode of the thyristor arm, and the anode of the thyristor arm will be connected to the lower DC bus bar.

Figure 8:
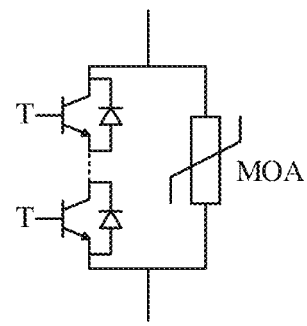
FIG. 8 is the circuit structural diagram of the main breaker cell of the ring-connected bridge-type multi-port hybrid DC circuit breaker according to an embodiment of the invention.

The shared main breaker branch includes a string of main breaker cells connected in series. FIG. 8 shows the circuit structural diagram of the main breaker cell of the ring-connected bridge-type multi-port hybrid DC circuit breaker according to an embodiment of the invention. Each main breaker cell is composed of multiple full-controlled power electronic switches (denoted as T) with anti-parallel diodes connected in series in the same direction and then connected in parallel with a metal oxide surge arrester (MOA). Besides, the current of the full-controlled power electronic switches in the main breaker cell only flows from the upper DC bus bar to the lower DC bus bar.

Figure 9:
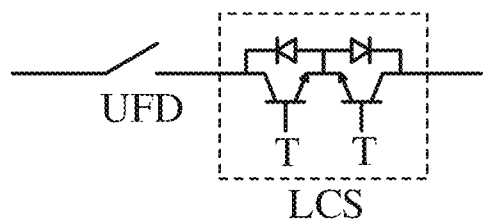
FIG. 9 is the circuit structural diagram of the bypass branch of the ring-connected bridge-type multi-port hybrid DC circuit breaker according to an embodiment of the invention.
Figure 10:
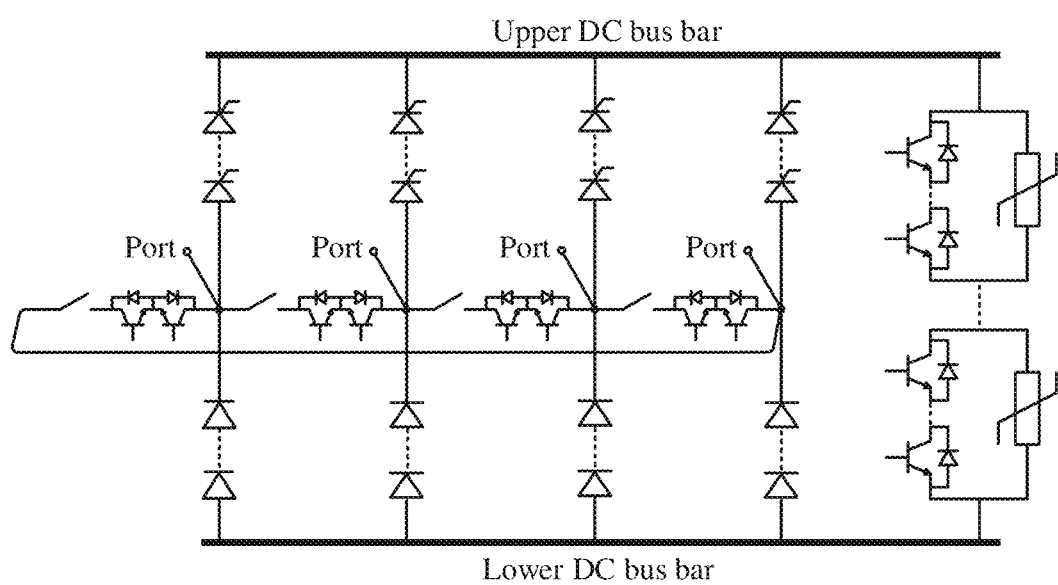
FIG. 10 is the circuit structural diagram of the ring-connected bridge-type multi-port hybrid DC circuit breaker according to an embodiment of the invention.

The bypass branch is formed by connecting a fast mechanical switch (UFD) and a load commutation switch (LCS) in series, and the load commutation switch is composed of two full-controlled power electronic switches (T) with anti-parallel diodes connected in reverse series. FIG. 9 shows the circuit structural diagram of the bypass branch of the ring-connected bridge-type multi-port hybrid DC circuit breaker according to an embodiment of the invention;

FIG. 10 is the circuit structural diagram of the ring-connected bridge-type multi-port hybrid DC circuit breaker according to an embodiment of the invention. The DC circuit breaker according to the embodiment of the invention has multiple ports, and the fault current of each port can be effectively interrupted. Therefore, the ring-connected bridge-type multi-port hybrid DC circuit breaker presented in this invention can be installed at the DC node or the DC bus connected with multiple (≥2) lines.

Figure 11:
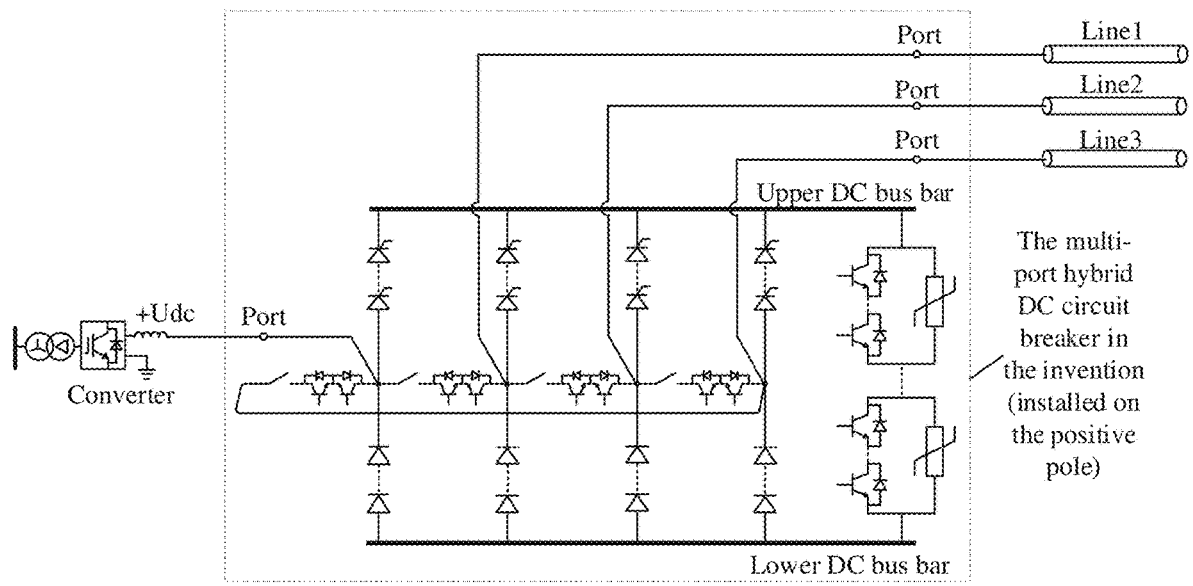
FIG. 11 is the installation schematic diagram of the ring-connected bridge-type multi-port hybrid DC circuit breaker on a DC node connected with 4 DC lines in a positive earthing system according to an embodiment of the invention.

For the positive grounding DC system, FIG. 11 has depicted the installation schematic diagram of the ring-connected bridge-type multi-port hybrid DC circuit breaker on a DC node connected with 4 DC lines according to an embodiment of the invention, in which the upper DC bus bar and the lower DC bus bar in the ring-connected bridge-type multi-port hybrid DC circuit breaker are equivalent to the DC bus of the DC system.

Figure 12:
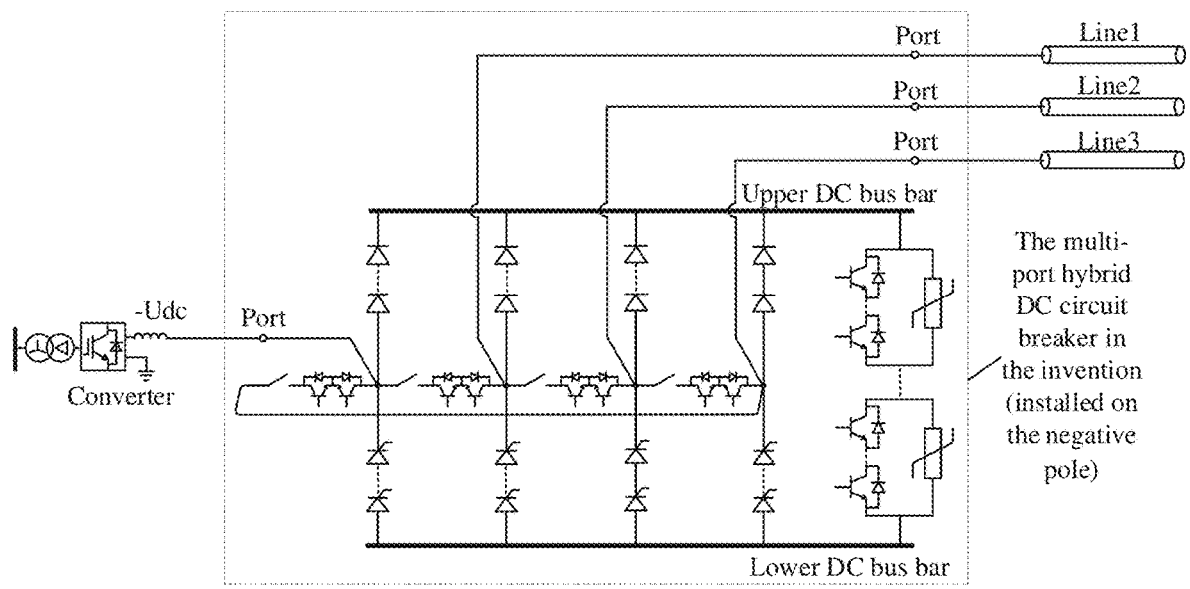
FIG. 12 is the installation schematic diagram of the ring-connected bridge-type multi-port hybrid DC circuit breaker on a DC node connected with 4 DC lines in a negative earthing system according to an embodiment of the invention.

Furthermore, to avoid the DC bus fault, when protecting the negative grounding system, we need to interchange the position of the thyristor arms and the diode arms. FIG. 12 shows the installation schematic diagram of the ring-connected bridge-type multi-port hybrid DC circuit breaker on a DC node connected with 4 DC lines in a negative earthing system according to an embodiment of the invention. Notably, the control strategy of the multi-port circuit breaker will not change.

This embodiment will take the installation scheme of the ring-connected bridge-type multi-port hybrid DC circuit breaker shown in FIG. 11 as an example, and assume that the fault occurs at port-1, to explain the working principle of the ring-connected bridge-type multi-port hybrid DC circuit breaker according to an embodiment of the present invention. The ring-connected bridge-type multi-port hybrid DC circuit breaker provides three basic operating modes and special operating modes. The three basic operating modes are: normal operation mode, fault interruption mode and the reclosing mode.

Normal Operation Mode

Figure 13:
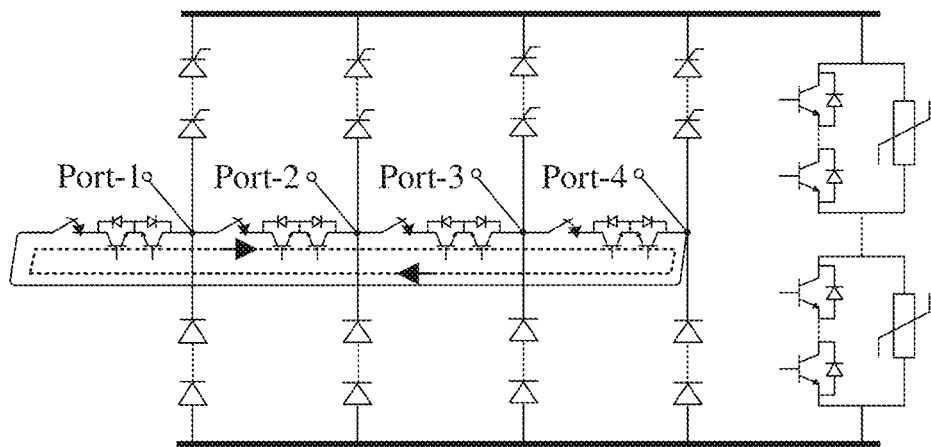
FIG. 13 is a schematic diagram of a current flow path of the ring-connected bridge-type multi-port hybrid DC circuit breaker in the normal operation mode according to an embodiment of the invention.

FIG. 13 is a schematic diagram of a current flow path of the ring-connected bridge-type multi-port hybrid DC circuit breaker in the normal operation mode according to an embodiment of the invention. As shown in FIG. 13, when the ring-connected bridge-type multi-port hybrid DC circuit breaker works in the normal operation mode, all the thyristor arms and the shared main breaker branch are in the off-state, all the bypass branches are in the conduction state, and the working current will only flow through the bypass branches.

Fault Interruption Mode

The fault interruption mode includes three stages: fault current detection stage, fault current commutation stage, and fault energy dissipation stage. For simplification, the ports where fault happens are defined as the faulty port while the other port is defined as the healthy port.

Fault Current Detection Stage

Figure 14:
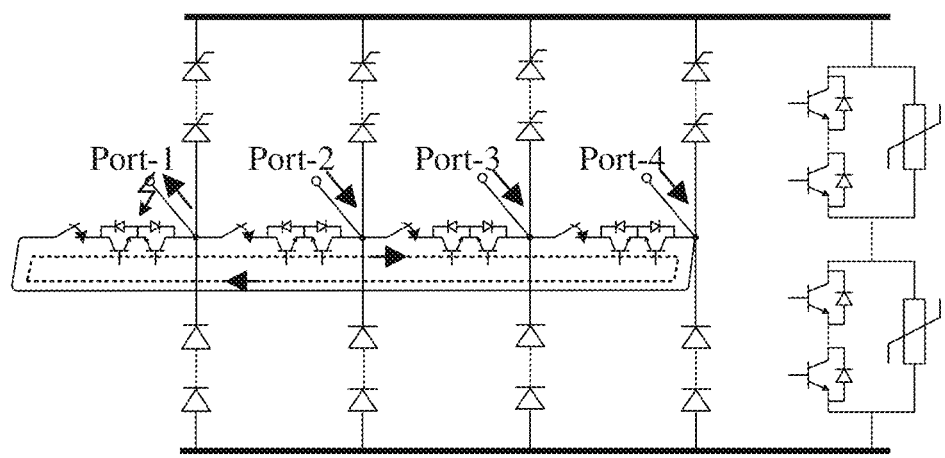
FIG. 14 is a schematic diagram of a current flow path in the fault current detection stage of the ring-connected bridge-type multi-port hybrid DC circuit breaker in the fault interruption mode according to an embodiment of the invention.

FIG. 14 is a schematic diagram of a current flow path in the fault current detection stage of the ring-connected bridge-type multi-port hybrid DC circuit breaker in the fault interruption mode according to an embodiment of the invention. The handling process of the ring-connected bridge-type multi-port hybrid DC circuit breaker in the fault current detection stage includes: a fault occurs at a port, and the protection of the DC gird detects the fault and sends the faulty port trip signal to the ring-connected bridge-type multi-port hybrid DC circuit breaker. In this stage, the ring-connected bridge-type multi-port hybrid DC circuit breaker still works in the normal operation mode, and the healthy port feeds current into the faulty port only through the bypass branch, as shown in FIG. 14.

The handling process of the fault commutation stage includes: after the ring-connected bridge-type multi-port hybrid DC circuit breaker receives the faulty port trip signal, conducting all the thyristor arms in the series circuits, and conducting the full-controlled power electronic switches in the main breaker branch; blocking the load commutation switches on the two bypass branches connected to the faulty port, when the current of the two bypass branches connected to the faulty port drops to zero, disconnecting the fast mechanical switches on the two bypass branches connected to the faulty port; since the thyristor arm, the diode arm and the shared main breaker branch together form an H-bridge circuit, the fault current can be effectively commutated to the shared main breaker branch regardless of the direction of the fault current.

When a ground fault occurs in the system, the faulty port is equivalent to being connected to the ground (the faulty port is at zero potential). If the system is a positive system, the healthy port will be at positive pressure, and the fault current will flow from the healthy port (positive potential) to the faulty port (zero potential); If the system is a negative system, the healthy port will be at negative pressure, and the fault current will flow from the faulty port (negative potential) to the healthy port (zero potential). Nevertheless, the control strategy is not affected regardless of the direction of the fault current because the breaker supports bidirectional current flow at any time.

Figure 15:
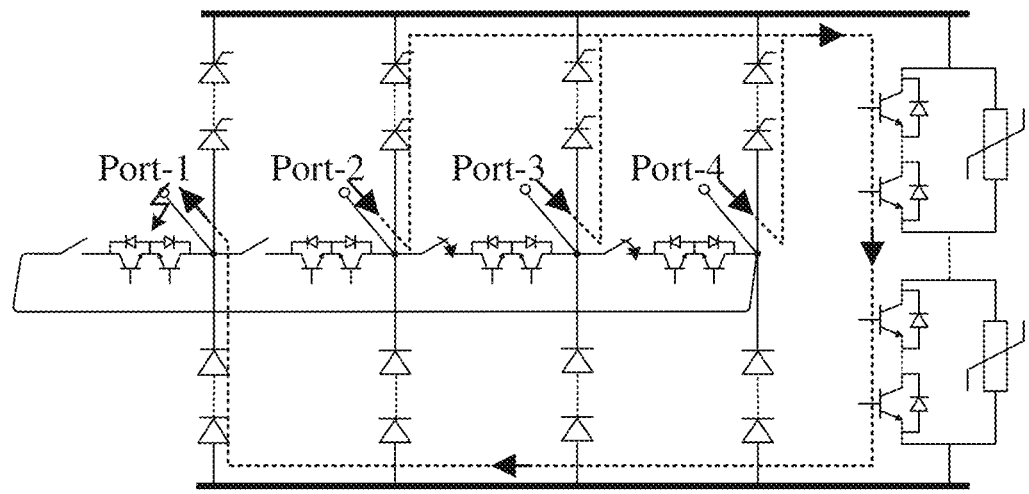
FIG. 15 is a schematic diagram of a current flow path in the fault current commutation stage of the ring-connected bridge-type multi-port hybrid DC circuit breaker in the fault interruption mode according to an embodiment of the invention.

FIG. 15 is a schematic diagram of a current flow path in the fault current commutation stage of the ring-connected bridge-type multi-port hybrid DC circuit breaker in the fault interruption mode according to an embodiment of the invention. As shown in FIG. 15, after receiving the port-1 tripping signal:

Step 1: immediately conduct all thyristor arms and the full-controlled power electronic switches in the main breaker branch;

Step 2: block the load commutation switches on the two bypass branches connected to the fault port;

Step 3, when the current flowing through the two bypass branches connected to the faulty port drops to zero, disconnect the fast mechanical switch on the two bypass branches.

For the positive grounding system, the fault current at the healthy port flows into the shared main breaker branch through the thyristor arm, then flows into the diode arm of the faulty port from the main breaker branch, and finally is injected into the faulty point through the diode arm of the faulty port.

Figure 16:
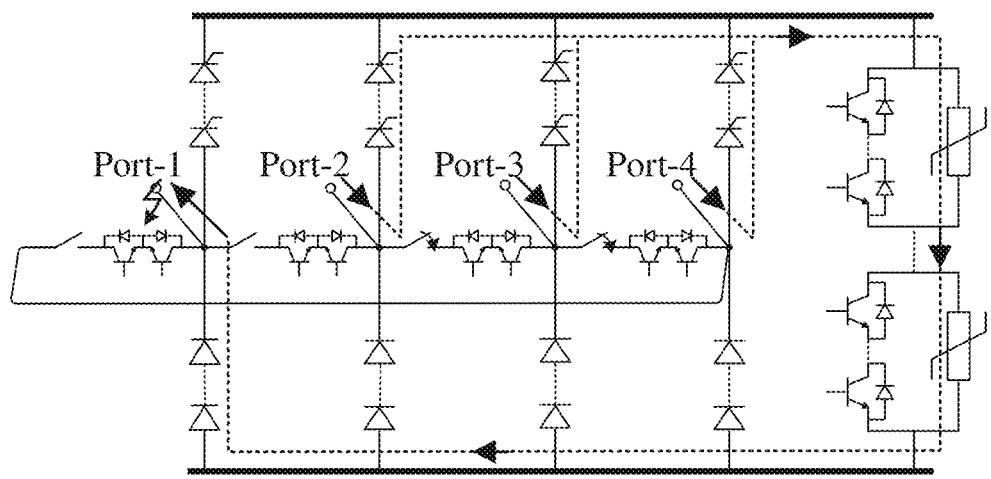
FIG. 16 is a schematic diagram of a current flow path in the fault energy dissipation stage of the ring-connected bridge-type multi-port hybrid DC circuit breaker in the fault interruption mode according to an embodiment of the invention.

Fault energy dissipation stage FIG. 16 is a schematic diagram of a current flow path in the fault energy dissipation stage of the ring-connected bridge-type multi-port hybrid DC circuit breaker in the fault interruption mode according to an embodiment of the invention. It is necessary to wait for the fast mechanical switch contacts on the two bypass branches connected to the faulty port to reach the rated opening distance after the fault current is commutated to the shared main breaker branch to avoid the re-ignition of the arc of the fast mechanical switch under overvoltage. When the contacts of the fast mechanical switch on the two bypass branches connected to the fault port reach the rated opening distance, blocking all the full-controlled power electronic switches on the main breaker branch, the generated transient interruption voltage will break down the surge arresters connected in parallel with the full-controlled power electronic switches, the fault current will be redirected to the surge arresters, the fault energy will then be dissipated by the surge arrester, and the fault current will gradually drop to zero.

Reclosing Mode

After the fault current drops to zero and deionization, the breaker switches to the reclosing mode. The reclosing mode contains three steps.

Step 1: conduct the full-controlled power electronic switches on the main breaker branch;

Step 2: after step 1, when a current surge appears on the ring-connected bridge-type multi-port hybrid DC circuit breaker, it means that the fault still exists on the DC line connected to the port to be reclosed, the full-controlled power electronic switches on the shared main breaker branch will be re-blocked again; when the surge current drops to zero, opening the disconnector connected at the faulty port and physically isolate the faulty port;

Step 3: after step 1, when the current surge doesn't appear on the ring-connected bridge-type multi-port hybrid DC circuit breaker, it means that there is no fault on the DC line connected to the port to be reclosed. Then, conduct the fast mechanical switches on the two bypass branches connected to the port to be reclosed, conduct the load commutation switches on the two bypass branches connected to the port to be reclosed, and block the full-controlled power electronic switches on the shared main breaker branch and the thyristor arms. In this way, the ring-connected bridge-type multi-port hybrid DC circuit breaker will recover to the normal operation mode.

Special Operating Mode

The special working mode includes two cases: simultaneous fault of multiple lines and successive fault of multiple lines. The circuit breaker of the invention can solve the problem of the fault current interruption under the special working condition using the above-mentioned three basic operation modes.

The simultaneous fault of multiple lines: since each port of the breaker in the invention interrupts the fault current independently from other ports. If multiple lines fail at the same time, the multiple faulty ports will be tripped at the same time without mutual influence. However, the shared main breaker branch will need to carry the sum of the fault currents of all the faulty ports.

The successive fault of multiple lines: if a line fails successively after the breaker has been tripped, the fault is defined as the successive multiple line fault. The breaker will deal with it depending on the fault detection time.

If these faults happen when the shared main breaker branch is in the blocked-state, their trip signals will be executed after the former line is isolated. Whereas, if these faults are detected when the shared main breaker branch is still in the conduction-state, the load commutation switch connected with the latter faulty port will be blocked, and the mechanical switch connected with it will be disconnected; after all the mechanical switches connected with the faulty port have reached the rated opening distance, block the full-controlled power electronic switches on the shared main breaker branch to interrupt the fault currents.

In summary, compared with the two-port hybrid DC circuit breaker scheme, the present ring-connected bridge-type multi-port hybrid DC circuit breaker can greatly reduce the number of full-controlled power electronic switches and the implementation cost while ensuring the same fault interruption capability. Compared with the existing ring-connected bridge-type multi-port hybrid DC circuit breaker, the present ring-connected bridge-type multi-port hybrid DC circuit breaker uses a smaller number of full-controlled power electronic switches, has a complete current interruption capability, and can solve the problem of bidirectional current interruption and the bus fault current interruption that are difficult for the existing ring-connected bridge-type multi-port hybrid DC circuit breaker to deal with.

The ring-connected bridge-type multi-port hybrid DC circuit breaker according to the embodiment of the invention can realize the bidirectional, arc-free and fast interruption of the fault current by using only one unidirectional main breaker branch; the fault current of multiple lines can be interrupted by using the same main breaker branch, and the number of power electronic switches in the DC circuit breaker can be greatly reduced in case of a large number of lines, and the cost is low. The bypass branch is connected by a ring structure, which has higher reliability for the current interruption.

Persons of ordinary skill in this art may understand that the drawings are only schematic diagrams of an embodiment, and the modules or processes in the drawings are not necessarily required to implement the present invention.

The embodiments in this specification are described in a progressive manner. The same or similar parts between the embodiments can be referred to each other. Each embodiment focuses on the differences from other embodiments. Particularly, for the device or system embodiment, since it is basically similar to the method embodiment, the description is relatively simple, and the relevant parts can be seen in the partial description of the method embodiment. The device and system embodiments described above are only schematic, wherein the unit described as a separation component can be or may not be physically separated, and the unit displayed as a unit can be or may not be a physical unit, that is, it can be located in one place, or it can be distributed to multiple network units. Those skilled in the art can understand and implement it without paying creative labor.

The above is only a preferred embodiment of the invention, but the scope of protection of the invention is not limited to this. Any change or replacement that can be easily thought of by any person familiar with the technical field within the technical scope of the invention shall be covered in the scope of protection of the invention. Therefore, the protection scope of the invention shall be subject to the protection scope of the claims.

The invention claimed is:

1. A ring-connected bridge-type multi-port hybrid DC circuit breaker comprising an upper DC bus bar, a lower DC bus bar, n thyristor arms, n diode arms, a shared main breaker branch, and n bypass branches when the n is number of ports and is an integer greater than or equal to 2;
   each thyristor arm connects in series with a diode arm, forming a series circuit, all of the series circuits are connected in parallel to the shared main breaker branch to form a parallel circuit, one end of the parallel circuit is connected to the upper DC bus bar while the other end is connected to the lower DC bus bar; each bypass branch is connected between every two adjacent series circuits, and a port is provided at the connection point of the thyristor arm and the diode arm in each series circuit; the port is used to connect a protected components or DC lines;
   all the bypass branches are connected into a ring, which provides a bidirectional flow path for a current in normal operating mode, all the thyristor arms, the diode arms, and the shared main breaker branch together form a bridge circuit, which is able to provide the bidirectional flow path for a fault current in a fault interruption mode and a reclosing mode.

2. The ring-connected bridge-type multi-port hybrid DC circuit breaker according to claim 1, wherein both ends of each bypass branch are respectively connected to a common connection point between each thyristor arm and the diode arm in two adjacent series circuits.

3. The ring-connected bridge-type multi-port hybrid DC circuit breaker according to claim 1, wherein each thyristor arm is formed by multiple thyristors connected in series in a same direction, and each diode arm is formed by multiple diodes connected in series in a same direction.

4. The ring-connected bridge-type multi-port hybrid DC circuit breaker according to claim 3, wherein the ring-connected bridge-type multi-port hybrid DC circuit breaker can be installed at a DC node or a DC bus connected with multiple DC lines, when the DC node or the DC bus is in a system's positive pole, a cathode of each thyristor arm will be connected to the upper DC bus bar, an anode of each thyristor arm will be connected to a cathode of each diode arm, and an anode of each diode arm will be connected to the lower DC bus bar;
   when the DC node or DC bus is in a system's negative pole, the cathode of each diode arm will be connected to the upper DC bus bar, the anode of each diode arm will be connected to the cathode of each thyristor arm, and the anode of each thyristor arm will be connected to the lower DC bus bar.

5. The ring-connected bridge-type multi-port hybrid DC circuit breaker according to claim 1, wherein the shared main breaker branch includes a string of main breaker cells connected in series, and each main breaker cell is composed of multiple full-controlled power electronic switches with anti-parallel diodes connected in series in a same direction and then connected in parallel with a metal oxide surge arrester; the current of the multiple full-controlled power electronic switches in each main breaker cell only flows from the upper DC bus bar to the lower DC bus bar.

6. The ring-connected bridge-type multi-port hybrid DC circuit breaker according to claim 1, wherein each bypass branch is formed by connecting a fast mechanical switch and a load commutation switch in series, and the load commutation switch is composed of two full-controlled power electronic switches with anti-parallel diodes connected in reverse series.

7. The ring-connected bridge-type multi-port hybrid DC circuit breaker according to claim 6, wherein an operation mode of the ring-connected bridge-type multi-port hybrid DC circuit breaker includes normal operation mode, the fault interruption mode and the reclosing mode;

when the ring-connected bridge-type multi-port hybrid DC circuit breaker works in the normal operation mode, all the thyristor arms and the main breaker branch are in the off-state, and all the bypass branches are in a conduction state, and a working current will only flow through all the bypass branches.

8. The ring-connected bridge-type multi-port hybrid DC circuit breaker according to claim 7, wherein when the ring-connected bridge-type multi-port hybrid DC circuit breaker works in the fault interruption mode, the ports where fault happens are defined as a faulty port while the other port is defined as a healthy port, the ring-connected bridge-type multi-port hybrid DC circuit breaker will successively go through a fault current detection stage, a fault current commutation stage and a fault energy dissipation stage;

a handling process of the ring-connected bridge-type multi-port hybrid DC circuit breaker in the fault current detection stage includes: a fault occurs at the faulty port, a protection of a DC grid detects the fault and sends a faulty port trip signal to the multi-port hybrid DC circuit breaker, and the ring-connected bridge-type multi-port hybrid DC circuit breaker still works in the normal operation mode, and the healthy port feeds current into the faulty port only through the bypass branch;

a handling process of the fault current commutation stage includes: after the ring-connected bridge-type multi-port hybrid DC circuit breaker receives the faulty port trip signal, conduct all the thyristor arms in the series circuits, and conduct the full-controlled power electronic switches in the shared main breaker branch;

block the load commutation switches on the two bypass branches connected to the faulty port, when the current of the two bypass branches connected to the faulty port drops to zero, disconnect the fast mechanical switches on the two bypass branches connected to the faulty port;

a handling process of the fault energy dissipation stage includes: after a contacts of the fast mechanical switch on the two bypass branches connected to the faulty port reach a rated opening distance, block all the full-controlled power electronic switches on the shared main breaker branch; then, a generated transient interruption voltage will break down the metal oxide surge arresters connected in parallel with the full-controlled power electronic switches, a fault current will be redirected to the metal oxide surge arresters, a fault energy will be dissipated by the metal oxide surge arrester, and the fault current will gradually drop to zero.

9. The ring-connected bridge-type multi-port hybrid DC circuit breaker according to claim 7, wherein when the ring-connected bridge-type multi-port hybrid DC circuit breaker works in the reclosing mode, a handling process contains the three steps:

step_1: conduct all the thyristor arms in the series circuit, conduct the full-controlled power electronic switches on the main breaker branch;

step_2: after step_1, when a current surge appears on the ring-connected bridge-type multi-port hybrid DC circuit breaker, it means that the fault still exists on the DC line connected to the port to be reclosed, the full-controlled power electronic switches on the shared main breaker branch will be re-blocked again; when the current surge drops to zero, opening a disconnector connected at the faulty port and physically isolate the faulty port;

step_3: after step_1, when the current surge doesn't appear on the ring-connected bridge-type multi-port hybrid DC circuit breaker, it means that there is no fault on the DC line connected the port to be reclosed; then, conduct the fast mechanical switches on the two bypass branches connected to the port to be reclosed, conduct the load commutation switches on the two bypass branches connected to the port to be reclosed, and block the full-controlled power electronic switches on the main breaker branch and the all thyristor arms; finally, the ring-connected bridge-type multi-port hybrid DC circuit breaker will recover to the normal operation mode.

10. The ring-connected bridge-type multi-port hybrid DC circuit breaker according to claim 7, wherein when multiple port faults occur in the ring-connected bridge-type multi-port hybrid DC circuit breaker, each faulty port will be isolated at the same time, and the shared main breaker branch will carry the sum of the fault currents of all the faulty ports.

* * * * *